United States Patent [19]

Hampel et al.

[11] Patent Number: 4,520,948
[45] Date of Patent: Jun. 4, 1985

[54] DISPOSABLE CONTAINER FOR LIQUIDS AND APPARATUS FOR DISPENSING LIQUID FROM SUCH CONTAINER

[75] Inventors: Hans-Joachim Hampel, Niederhöchstadt; Ludwig Scondo, Frankfurt am Main; Jürgen Stahl, Frankfurt am Main; Wilhelm Wegner, Frankfurt am Main, all of Fed. Rep. of Germany; Harry Bonne, Meilen, Switzerland

[73] Assignee: Jacobs Beverage Systems AG, Zug, Switzerland

[21] Appl. No.: 328,799

[22] Filed: Dec. 8, 1981

[30] Foreign Application Priority Data

Dec. 8, 1980 [CH] Switzerland ............... 9035/80

[51] Int. Cl.³ .................................. G01F 11/02
[52] U.S. Cl. ...................... 222/103; 222/105; 222/181; 222/207; 222/494; 137/844
[58] Field of Search ........... 222/92, 95, 103, 105, 222/107, 209, 212, 213, 214, 215, 491, 530, 494, 64, 146 C, 180, 181, 185, 207; 137/843, 844

[56] References Cited

U.S. PATENT DOCUMENTS

| | | | |
|---|---|---|---|
| 2,647,661 | 8/1953 | Harvey | 222/68 |
| 3,117,695 | 1/1964 | Cox | 222/107 X |
| 3,199,742 | 8/1965 | Hill | 222/183 |
| 3,205,889 | 9/1965 | Alder et al. | 222/107 X |
| 3,217,368 | 11/1965 | Pototschnigg | 222/64 X |
| 3,534,771 | 10/1970 | Eyerdam | 222/494 X |
| 3,811,294 | 5/1974 | Taylor | 222/146 C X |
| 4,130,224 | 12/1978 | Norman | 222/207 X |
| 4,220,259 | 9/1980 | Lagneaux | 222/103 X |
| 4,228,926 | 10/1980 | Gordon | 222/103 |
| 4,256,242 | 3/1981 | Christine | 222/494 X |
| 4,349,133 | 9/1982 | Christine | 222/207 X |

FOREIGN PATENT DOCUMENTS 2908654  9/1980  Fed. Rep. of Germany ...... 222/105

*Primary Examiner*—Joseph J. Rolla
*Assistant Examiner*—Kevin P. Shaver
*Attorney, Agent, or Firm*—Cushman, Darby & Cushman

[57] ABSTRACT

A flat, rectangular box 4 formed of cardboard contains a bag 18 of multi-layered foil material. A tube 24, which is disposed in the interior of the box in the transport condition of the package and can be removed from the box interior through an opening 10 which is closed by a tear-off strip, which is connected in liquid-tight manner to the bag 18 by a connecting piece. An outlet 36 provided at the free end of the tube is controlled by a pressure relief valve, which is provided in the tube and opens in the direction of the outlet. The walls of the narrow sides of the box each have a longitudinal fold along which these walls can fold outwards when the broad sides of the box are pressed together in order to empty the bag filled with a fluid, e.g. coffee extract. The one-way package is particularly suitable for use in a beverage vending machine in place of the storage containers employed until now. A suspension flap 12 of the box, which can be separated away from one of the broad sides, serves for interchangeably securing the container in the vending machine for the extraction of the fluid.

5 Claims, 5 Drawing Figures

DISPOSABLE CONTAINER FOR LIQUIDS AND APPARATUS FOR DISPENSING LIQUID FROM SUCH CONTAINER

BACKGROUND OF THE INVENTION

The invention relates to a one-way package for fluids. For supplying coffee machines with coffee in extract form it is already known, in place of a refillable container which forms part of the automatic machine, to use a one-way package of the above-mentioned kind. Machine maintenance is considerably simplified in that the parts requiring cleaning are formed by the one-way package, the work of refilling being also accomplished by inserting the one-way package.

When the full package is inserted in the automatic machine the parts of the extraction duct located before and after the metering chamber are taken between squeezing mechanisms, while a pipe for heated water, controlled by a valve, is connected to a connecting piece of the package which discharges into the metering chamber. In order to prevent the undesired emptying of the package during transport, when being stored and while being inserted into the machine, the outlet opening and the water connecting piece are shut off by closures which are removable after insertion.

During the extraction of fluid from the package storage space, the squeezing mechanism located after the metering chamber is closed, while the squeezing mechanism located ahead of the metering chamber is opened. The metering chamber is filled under the static pressure of the fluid in the storage space. For the delivery of the metered quantity the squeezing mechanism located ahead of the metering chamber is closed, while the squeezing mechanism located after the metering chamber and also the valve of the water pipe are opened.

On the one hand, the known package has the disadvantage that when the one-way package is inserted into the automatic machine the water connecting piece has to be opened by removing the closure. Extract fluid cannot then be prevented from flowing out of the connecting piece and dirtying the machine.

On the other hand, there exists the disadvantage that as emptying of the storage space proceeds, the time required to fill the metering space which, owing to the high viscosity of the extract fluid is in any case relatively long, increases. A time control provided in the automatic machine must therefore be set to the longest possible metering space filling time. Furthermore, a new metering operation cannot be initiated until the assigned quantity of water has also flowed through the metering space. The efficiency of a machine served by packages of this type is correspondingly limited.

SUMMARY OF THE INVENTION

Accordingly, an object of the invention is to provide a one-way package for fluids which enables speedy metering and extraction of fluid.

By virtue of the squeezability of the storage space of the package, it is possible to extract fluid from it forcibly and consequently to fill the metering chamber in an interval of time which is independent of the state of filling of the storage space and is constant for a given size of portion. Because of the squeezability of the metering chamber, this can be emptied in a shorter time than if the metered commodity had to be flushed out. For this reason, the package allows a given number of fluid portions to be dispensed in a shorter period of time. In addition to this, the changing of the one-way packages does not necessitate either disconnection from or connection to the water pipe and thereby the changing operation in automatic machines is simplified.

According to a preferred embodiment of the one-way package according to the invention, the closure which closes the outlet during storage and transport is the same as the one which controls the metering chamber during operation. According to the invention this is possible because the extraction duct has a pressure relief valve located after the metering chamber, opening in the direction of the outlet. In this way, not only is the package changing operation in the automatic machine further simplified in that the removal of a special closure is dispensed with and an undesired leakage of fluid from the extraction duct after this closure has been removed is eliminated; but the construction of the closure as a pressure relief valve, together with the squeezability of the metering chamber renders superfluous control of the closure element in operation.

In accordance with a preferred further embodiment of the one-way package according to the invention the walls of the storage space are formed by a lining of a flat package box, the narrow sides of the box each having a longitudinal fold. Due to the foldability of the narrow sides the squeezability of the storage space is maintained, although this is located in the interior of a package box serving for transport and storage.

In accordance with a further preferred embodiment of the one-way package according to the invention, the storage space is defined by a bag of foil material, to which bag a tube of rubber-elastic forming the extraction duct is connected, the foil material of the bag forming the lining of the package box.

The invention also relates to an apparatus for the extraction of fluid from a one-way package of the type mentioned at the beginning, the extraction duct being provided with one efficient shut-off device between storage space and metering chamber and with one between metering chamber and outlet. The extraction apparatus is characterised in that at least one pressure-generating plate having drive means is provided for the storage space and a drivable squeezing-out piston is provided for the metering chamber, the efficient shut-off device between metering chamber and outlet being a pressure relief valve opening towards the outlet. An extraction apparatus of this type enables the dispensing of liquid portions to be controlled by very simple means.

In the following the one-way package according to the invention and the extraction apparatus according to the invention are each more specifically described in respective embodiments having regard to the drawings.

DETAILED DESCRIPTION

Figure 1:
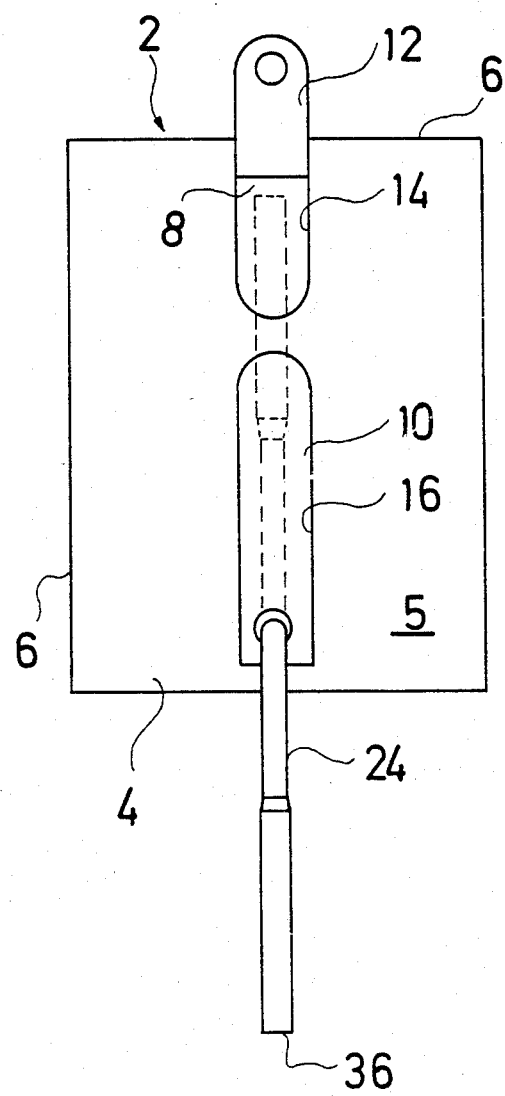
FIG. 1 shows the one-way package according to the embodiment in elevation, in a condition in which it is ready for operation.

Generally, 2 in the drawing denotes a one-way package whose external form, at least during transport and storage, is determined by a flat, rectangular cardboard box 4. On its broad side denoted by 5, the box 4 has longitudinal openings 8 and 10, and also a suspension flap 12 which is detached from the broad side 5 along a line 14 of perforations of the opening 8, formed in the broad side, and bent over through 180°. A strip, not shown, torn off along the line 16 of perforations closes the opening 10 during transport and storage. The box 4 contains a lining in the form of a bag 18 of foil material, which defines a storage space 20 (FIG. 2). Preferably, the foil material consists of several layers and has at least one layer of plastics and at least one layer of metal, the latter forming a diffusion barrier and the layer of plastics forming the innermost layer in the bag 18. A connecting piece 22 is connected in a fluid-tight manner to the bag 18, to which connecting piece a tube 24 of rubber-elastic material is connected by means of a coupling 26 formed on the tube. The coupling 26 is held on the connecting piece 22 by a safety ring 28. The tube 24 is housed in the interior of the box 4 before it is opened, substantially as shown in dotted lines in FIG. 1. Accordingly, although it forms part of the one-way package, this tube does not hinder transport and storage of the package.

Figure 2:
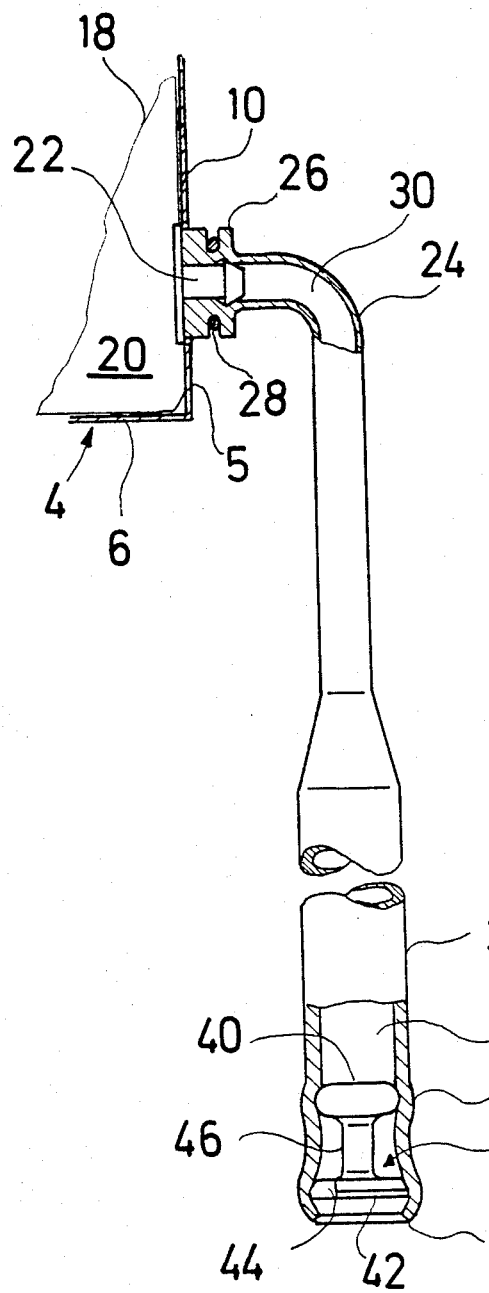
FIG. 2 shows a section to a larger scale, of a portion of the structure shown in FIG. 1.
Figure 2A:
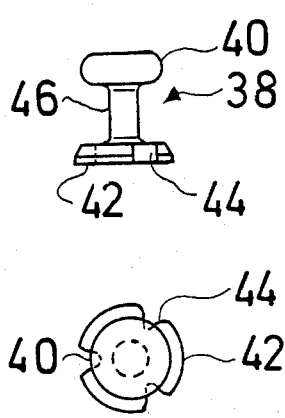
FIGs. 2a and 2b show a detail from FIG. 2 in elevation and in plan.
Figure 2B:
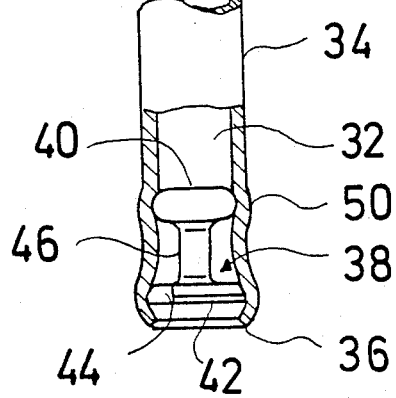

For the extraction of the contents, i.e. of the fluid from the bag 18, the tube 24 can be drawn out of the box 4 through the torn-out opening 10 so that it takes up the position shown in FIG. 1 (in full lines) and in FIG. 2. In any case, the tube 24 contains an extraction duct 30, connected to the storage space 20 by the connecting piece 22, and also a metering chamber 32 in a tube section 34 having a diameter larger than the diameter of the tube over the remainder of its length. Finally, in its section 34, the tube 24 defines an outlet 36 at the end of the extraction duct 30 and contains an insert 38 disposed between metering chamber 32 and outlet 36.

The insert 38 includes a plug 40 of circular form cross section and rounded profile, a foot portion 42, also of circular form, with a diameter larger than the plug 40, the foot portion having gaps 44 disposed at spaced intervals on its periphery, and also a shaft 46, of reduced diameter compared with the plug 40, which fixedly joins the latter to the foot portion 42. Together with the wall of the tube 24, the plug 40 forms a pressure relief valve, in that the tube grips around the plug with a pre-tension. On the other hand, the plug 40 is secured against displacement within the tube 24 in that the foot portion 44, because of its larger outside diameter, is gripped onto by the tube 24 with greater pre-tension than the plug 40. If a pressure is built up in the fluid contained in the metering chamber 32 which cannot be reduced in the direction of the storage space 20, the tube is lifted away from the surface of the plug when the pressure developing has exceeded a value determined by the pre-tension of the tube. Fluid contained in the metering chamber 32 can therefore flow without hindrance along the shaft 46 and through the gaps 44 in the foot portion 42 to the outlet 36. The greater pre-tension of the tube at the foot portion 42 prevents a displacement of the insert 38 before the pressure relief valve 50 has opened. Depending upon the respective dimensions of the insert 38 and of the tube section 34, and also upon the elasticity of the tube itself, it is possible to select the opening pressure of the pressure relief valve 50 between 1.5 and 6 bar. As an alternative or in addition to a larger diameter, the foot portion 44 can be gripped from below by a bead (not shown) which is provided on the inside of the tube in the vicinity of the outlet 36 in order to secure the insert 38.

Figure 3:
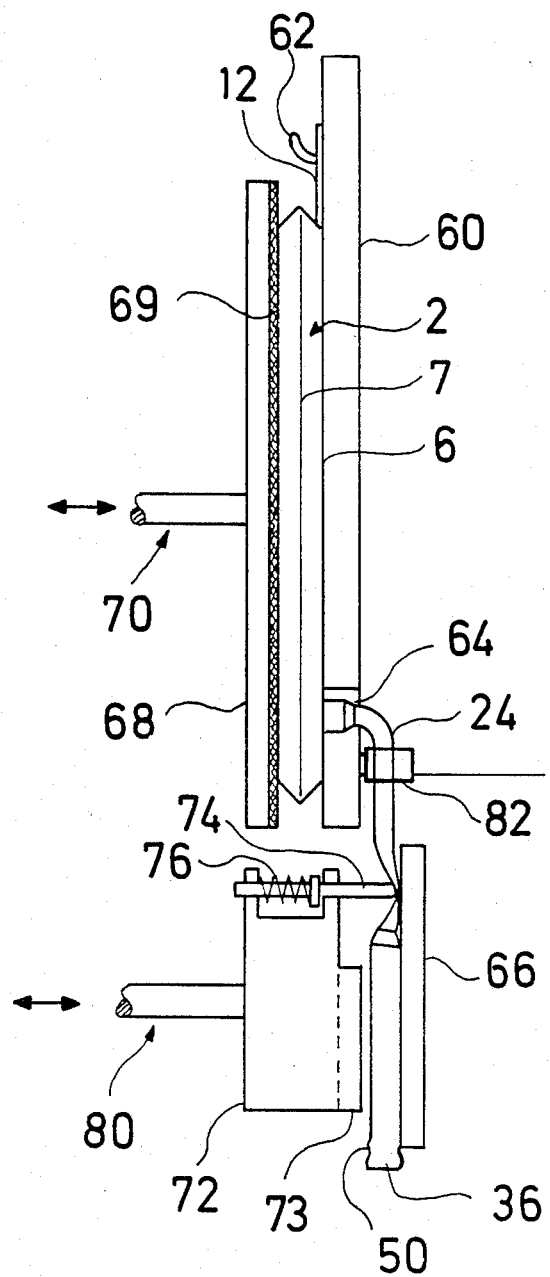
FIG. 3 shows the extraction apparatus according to the embodiment schematically in vertical section with a one-way package inserted.

In the extraction apparatus illustrated diagrammatically in FIG. 3, a one-way package of the type previously described is shown in the ready-to-extract condition. The extraction apparatus includes a base plate 60, which can have a cooling device (not shown) and on which the one-way package 2 is secured on a hook 62 by means of the suspension flap 12. The coupling 26 and tube 24 of the one-way package 2 protrude from the extraction apparatus through a notch 64 in the base plate 60. Finally, the extraction apparatus according to the illustrated embodiment also includes a monitoring device having a transmitting element 82, which may be capacitive, gripping onto the tube 24 above the squeezing bolt 74.

The outlet 36 of the one-way package 2 is directed towards a take-out station (not shown) of the extraction apparatus where a drinking vessel, e.g. a beaker, is normally placed. If the extraction apparatus forms part of a beverage dispensing automatic machine, e.g. a coffee machine, further delivery elements will also discharge at the take-out station, e.g. for hot water, milk and/or cream and also sugar. In order now to extract fluid from the one-way package 2, or its storage space 20, e.g. coffee extract in measured quantities for the preparation of a beaker filling, the extraction apparatus operates in the manner described below.

When the extraction apparatus is in the starting position the pressure piston 72 is withdrawn, compared with the intermediate position shown in FIG. 3, i.e. to the extent that the squeezing bolt 74 has released the tube 24. The extraction duct 30 is therefore open between storage space 20 and metering chamber 32. Under the constant internal pressure prevailing in the storage space 20, which is produced by the pressure generating plate 68 on drive means 70 and is preferably between 0.1 and 0.3 bar, the metering chamber is accordingly filled. However, because of its considerably higher opening pressure the pressure relief valve 50 cannot release fluid in the direction of the outlet 36. Following the process of filling the metering chamber 32 the pressure piston 72 is moved by the drive means 80 in the direction of the opposing plate 66. The position shown in FIG. 3, in which the squeezing bolt 74 has closed off the extraction duct 30 above the metering chamber 32, is thereby traversed, that is, before the squeezing-out piston 72 has begun to have an effect on the tube section 34. When the squeezing-out piston 72 starts pressing the tube section 34 together, an internal pressure which is higher than the filling pressure builds up as a result in the metering chamber 32, which internal pressure exceeds the opening pressure of the pressure relief valve 50. Fluid is accordingly forced out of the metering chamber 32 in the direction of the outlet 36, until the squeezing-out piston has reached the end of its squeezing-out stroke (movement to the right in FIG. 3) and the excess pressure in the metering chamber is reduced. (The spring 76 permits the pressure piston to move to the right from the position shown without further rightward movement of the squeezing bolt 74, which is already in its right-most position as depicted.)

With the return of the squeezing-out piston 72 to the left, the tube section 34 is relieved, the pressure in the metering chamber 32 droping below the filling pressure before the squeezing bolt 74 releases the tube 24 after the position shown in FIG. 3 has been traversed and the extraction duct 30 is open. Under the influence of the filling pressure in the storage space 20 the metering chamber 32 is now very quickly filled with fluid again. The extraction apparatus is thereby ready for a further extraction operation.

To enable fluid to be extracted from the bag 18 until it is completely empty and also to enable filling of the metering chamber 32 under constant pressure in spite of stiffness of the walls of the box 24, the latter has longitudinal folds 7 in its narrow sides 6, disposed approximately in the middle and extending in the longitudinal direction. As a result, the narrow sides can fold out along these longitudinal folds on the entire periphery of the box. Finally, the pressure generating plate 68 has an elastic compensating layer 69 on the side thereof facing the base plate 60. The compensating layer 69 is therefore able to equalise unevennesses to a limited extent, for example, in the region of the box edges. Accordingly, it is not possible for pockets to form in the box 4 from which the fluid could not be squeezed out, even when the box is pressed together.

If during an extraction operation the amount of fluid contained in the bag is no longer sufficient to fill the metering chamber 32 to the extent that in addition the extraction duct 24 will also remain full up to the vicinity of the coupling 26, the transmitting element 82 of the monitoring device is actuated and blocks, for example, the drive means 80. Because of this, the squeezing-out piston 72 remains in the starting position. In addition, in the case of a coin-operated machine the acceptance of money can be blocked by the monitoring device and can remain blocked until such time as the transmitting element 82 detects that liquid is again available, e.g. after the empty one-way package 2 has been exchanged for a full package.

It is obviously also possible to form the extraction apparatus to receive several one-way packages 2 in a ready-for-extraction position, at least the outlets 36 of two packages being directed towards the same take-out point. In this way the monitoring device can initiate the extraction out of the second package when the first package is exhausted. In place of a cooled base plate 60 the extraction apparatus can also have one or several cooled withdrawable compartments for one-way packages for the purpose of keeping the contents fresh while being used.

It follows from the foregoing that the changing of the one-way package in an extraction apparatus can be achieved in very simple manner and without the contents of the bag flowing out unintentionally, because the pressure relief valve 50 remains closed unless emptying is intended, and no connections to pipes conveying fluid have to be made.

Insofar as this is desired, the extraction apparatus can be made adjustable with respect to the size of portions or the quantity of fluid dispensed in an extraction operation.

This can be achieved either in that the head 73 provided on the squeezing-out piston 72 is not disposed fixedly, but pivotably, e.g. about a horizontally extending axis on its upper edge, and to be adjustable in its pivoted position. Depending upon the tilt of the head 73 a larger or smaller quantity of fluid will accordingly be squeezed out of the metering chamber 32. The same effect can be achieved by varying the stroke of the squeezing-out piston 72 in such a manner that is moved closer to or less close to the opposing plate 66.

The arrangement of the extraction duct 30 in the form of a tube of rubber-elastic material has not only the advantage that its elasticity can be utilised not only in the functioning of the pressure relief valve, but this also permits the tube to be reliably sealingly closed off by the squeezing bolt so as to prevent a back flow of fluid out of the metering chamber 4 when this is squeezed. In the region of the tube in which the metering chamber 32 is formed, as elastic behaviour is not however advantageous. If the emptying pressure in the bag is not constant, the volume of the metering chamber can vary accordingly and lead to metering errors. It is therefore certainly advantageous for the tube to be arranged to be flexible in its part which defines the metering chamber 32, but not to be elastic, or to be less elastic than in the other parts. This can be achieved, for example, by increasing the wall strength in that part or else by providing a non-elastic sheath or a fabric insertion.

With the apparatus operating in an alternative manner, the arrangement of parts illustrated in FIG. 3 can also even depict the starting position, the metering chamber still being empty, because the squeezing bolt 74 has not yet cleared the extraction duct 30. This has the advantage that the fluid is held back in the region cooled by the base plate 60 until a new extraction takes place.

We claim:

1. A one-way package for storing fluid and from which the stored fluid may be dispensed in successive metered portions, said one-way package comprising:

means defining a fluid-tight bag enclosing a fluid storage space;

an extraction tube having an inlet end sealingly communicated through said bag to said fluid storage space and an outlet end disposed externally of said fluid storage space;

a flat package box surrounding said bag, said flat package box being made of relatively stiff material compared with said bag and being constructed and arranged for also containing said tube, for storage;

said tube including an extraction duct extending therealong, a longitudinally extending portion of which provides a metering chamber normally in communication with said inlet end of said tube;

said tube further including a pressure relief valve provided for said extraction duct near said outlet end of said tube for normally closing said outlet end of said tube;

means provided between said inlet end of said tube and said metering chamber constructed and arranged for permitting interruption in communication between said metering chamber and said inlet end of said tube;

means for squeezing the bag; said flat package box including two relatively broad opposed wall means which are perimetrically joined to one another by relatively narrow wall means, these relatively narrow wall means including a total of one, outwardly-bowed fold line means extending perimetrically of the flat package box on the relatively narrow wall means approximately midway between the two relatively broad opposed wall means, whereby said bag may be emptied in dispensing fluid from said fluid storage space into said duct by actuating said means for squeezing the bag by pressing one of said two relatively broad opposed wall means towards the other of said two relatively broad opposed wall means while permitting said relatively narrow wall means to fold on itself along said fold line means.

2. The one-way package of claim 1, wherein:
said bag is constituted of foil material including at least one layer of metal forming a diffusion barrier, and at least one layer of plastics including a layer of plastics forming an innermost layer of said bag.

3. Apparatus for extracting in a succession of metered portions connected fluid from a one-way package for storing such fluid, of the type which includes:
means defining a fluid-tight bag enclosing a fluid storage space;
an extraction tube having an inlet end sealingly communicated through said bag to said fluid storage space and an outlet end disposed externally of said fluid storage space;
a flat package box surrounding said bag, and being constructed and arranged for also containing said tube, for storage;
said tube including an extraction duct extending therealong, a longitudinally extending portion of which provides a metering chamber normally in communication with said inlet end of said tube;
said tube further including a pressure relief valve provided for said extraction duct near said outlet end of said tube for normally closing said outlet end of said tube;
means provided between said inlet end of said tube and said metering chamber constructed and arranged for permitting interruption in communication between said metering chamber and said inlet end of said tube;
means for squeezing the bag; said flat package box including two relatively broad opposed wall means which are perimetrically joined to one another by relatively narrow wall means, these relatively narrow wall means including fold line means extending perimetrically of the flat package box on the relatively narrow wall means approximately midway between the two relatively broad opposed wall means, whereby said bag may be emptied in dispensing fluid from said fluid storage space into said duct by actuating said means for squeezing the bag by pressing one of said two relatively broad opposed wall means towards the other of said two relatively broad opposed wall means while permitting said relatively narrow wall means to fold on itself along said fold line means;
said apparatus comprising:
Supporting and pressing means for the flat package box including a pressure-generating plate spacedly confronting a base plate, means on one of these plates effectively cooperable with the flat package box for supporting the flat package box from that plate in such an orientation that the base plate may engage one broad wall means of the flat package box and the pressure-generating plate may engage the other broad wall means of the flat package box, with the tube extending out of the flat package box and the outlet end of said tube extending out from between said plates; the pressure generating plate being constructed and arranged to be pressed towards said base plate for increasing pressure on said fluid in said fluid storage space of said bag and in said inlet end of the extraction by further flattening said flat package box with attendant folding of the relatively narrow wall means thereof on said fold line means; and
means for selectively externally applying squeezing pressure to the metering chamber while the metering chamber is interrupted by said interruption permitting means from communication from the inlet end of said tube such as would permit backflow of fluid past said interruption permitting means from said metering chamber towards said inlet end of said tube, said means for selectively externally applying squeezing pressure being constructed and arranged to apply such squeezing pressure to said metering chamber as to temporarily exceed the capability of said pressure relief valve for said extraction duct to remain closed, whereby a corresponding quantum of fluid contained in the metering chamber is dispensed from said outlet end of said tube.

4. Apparatus for extracting in a succession of metered portions contained fluid from a one-way package storing such fluid, comprising:
a one-way package, including:
means defining a fluid-tight bag enclosing a fluid storage space;
an extraction tube having an inlet end sealingly communicated through said bag to said fluid storage space and an outlet end disposed externally of said fluid storage space;
a flat package box surrounding said bag, and being constructed and arranged for also containing said tube, for storage;
said tube including an extraction duct extending therealong, a longitudinally extending portion of which provides a metering chamber normally in communication with said inlet end of said tube;
said tube further including a pressure relief valve provided for said extraction duct near said outlet end of said tube for normally closing said outlet end of said tube;
means provided between said inlet end of said tube and said metering chamber constructed and arranged for permitting interruption in communication between said metering chamber and said inlet end of said tube;
means for squeezing the bag; said flat package box including two relatively broad opposed wall means which are perimetrically joined to one another by relatively narrow wall means, these relatively narrow wall means including fold line means extending perimetrically of the flat package box on the relatively narrow wall means approximately midway between the two relatively broad opposed wall means, whereby said bag may be emptied in dispensing fluid from said fluid storage space into said duct by actuating said means for squeezing the bag by pressing one of said two relatively broad opposed wall means towards the other of said two relatively broad opposed wall means while permitting said relatively narrow wall means to fold on itself along said fold line means;
supporting and pressing means for the flat package box including a pressure-generating plate spacedly confronting a base plate, means on one of these plates effectively cooperable with the flat packing box for supporting the flat package box from that plate in such an orientation that the base plate engages one broad wall means of the flat packing box and the pressure-generating plate engages the other broad wall means of the flat packing box, with the tube extending out of the flat packing box and the outlet end of said tube extending out from between said plates; the pressure generating plate being constructed and arranged to be pressed towards said base plate for increasing pressure on said fluid in said fluid storage space of said bag and in said inlet end of the extraction by further flattening said flat packing box with attendant folding of the relatively narrow wall means thereof on said fold line means; and means for selectively externally applying squeezing pressure to the matching chamber while the metering chamber is interrupted by said interruption permitting means from communication from the inlet end of said tube such as would permit backflow of fluid past said interruption permitting means from said metering chamber towards said inlet end of said tube, said means for selectively externally applying squeezing pressure being constructed and arranged to apply such squeezing pressure to said metering chamber as to temporarily exceed the capability of said pressure relief valve for said extraction duct to remain closed, whereby a corresponding quantum of fluid contained in the metering chamber is dispensed from said outlet end of said tube.

5. The apparatus of claim 4, wherein:

said interruption permitting means provided between the inlet end of said tube and the metering chamber is constituted by a squeezing bolt mounted to said means for selectively externally applying squeezing pressure to the metering chamber while the metering chamber is interrupted by said interruption permitting means from communication from the inlet end of said tube.

* * * * *